United States Patent [19]

Occelli

[11] Patent Number: 5,614,453
[45] Date of Patent: *Mar. 25, 1997

[54] CATALYST CONTAINING ZEOLITE BETA AND A PILLARED CLAY

[75] Inventor: Mario L. Occelli, Yorba Linda, Calif.

[73] Assignee: UOP, Des Plaines, Ill.

[*] Notice: The term of this patent shall not extend beyond the expiration date of Pat. No. 5,023,221.

[21] Appl. No.: 328,688

[22] Filed: Oct. 25, 1994

Related U.S. Application Data

[62] Division of Ser. No. 757,837, Sep. 11, 1991, Pat. No. 5,374,349.

[51] Int. Cl.$^6$ ............................................. B01J 29/06
[52] U.S. Cl. ............................. 502/66; 502/68; 502/74
[58] Field of Search .................................. 502/68, 74, 80, 502/66

[56] References Cited

U.S. PATENT DOCUMENTS

| | | | |
|---|---|---|---|
| Re. 28,341 | 2/1975 | Wadlinger et al. | 208/120 |
| 3,923,641 | 12/1975 | Morrison | 208/111 |
| 4,176,090 | 11/1979 | Vaughan et al. | 423/328 |
| 4,248,739 | 2/1981 | Vaughan et al. | 423/328 |
| 4,486,296 | 12/1984 | Oleck et al. | 208/111 |
| 4,601,993 | 7/1986 | Chu et al. | 208/111 |
| 4,612,108 | 9/1986 | Angevine et al. | 208/111 |
| 4,637,991 | 1/1987 | Battiste et al. | 502/68 |
| 4,676,887 | 6/1987 | Fischer et al. | 208/61 |
| 4,740,292 | 4/1988 | Chen et al. | 208/120 |
| 4,742,033 | 5/1988 | Harris et al. | 502/68 |
| 4,753,909 | 6/1988 | Bousquet et al. | 502/84 |
| 4,756,822 | 7/1988 | Chen et al. | 208/111 |
| 4,812,223 | 3/1989 | Hickey, Jr. et al. | 208/111 |
| 4,816,538 | 3/1989 | Abdo | 208/111 |
| 4,837,396 | 6/1989 | Herbst et al. | 502/67 |
| 4,844,790 | 7/1989 | Occelli | 208/46 |
| 4,857,169 | 8/1989 | Abdo | 208/111 |
| 4,867,861 | 9/1989 | Abdo et al. | 208/111 |
| 4,891,458 | 1/1990 | Innes et al. | 585/323 |
| 4,911,823 | 3/1990 | Chen et al. | 208/67 |
| 4,952,544 | 8/1990 | McCauley | 502/65 |
| 4,985,384 | 1/1991 | Gilson | 502/61 |
| 4,990,476 | 2/1991 | Ward | 502/66 |
| 5,023,221 | 6/1991 | Occelli | 502/66 |
| 5,076,907 | 12/1991 | Occelli | 208/111 |
| 5,077,253 | 12/1991 | Chu et al. | 502/68 |
| 5,275,720 | 1/1994 | Ward | 208/111 |
| 5,279,726 | 1/1994 | Ward | 208/111 |
| 5,328,590 | 7/1994 | Occelli | 208/111 |
| 5,350,501 | 9/1994 | Ward | 208/111 |
| 5,413,977 | 5/1995 | Occelli | 52/68 |

FOREIGN PATENT DOCUMENTS

| | | |
|---|---|---|
| 0243629 | 11/1987 | European Pat. Off. . |
| WO8806614 | 9/1988 | WIPO . |

OTHER PUBLICATIONS

M.L. Occelli and R. J. Rennard, "Hydrocracking with Pillared Clays," *American Chemical Society Division of Fuel Chemistry*, Preprints of Papers, vol. 29, No. 6, 1984, pp. 30–39.

*Primary Examiner*—Michael Lewis
*Assistant Examiner*—Thomas G. Dunn, Jr.
*Attorney, Agent, or Firm*—Thomas K. McBrife; John F. Spears, Jr.

[57] ABSTRACT

A composition of matter comprising zeolite Beta and a pillared clay is especially suited for use in combination with one or more hydrogenation components as a catalyst for hydrocracking various types of feedstocks.

7 Claims, No Drawings

CATALYST CONTAINING ZEOLITE BETA AND A PILLARED CLAY

CROSS-REFERENCES TO RELATED APPLICATIONS

This application is a division of U.S. patent application Ser. No. 757,837, filed in the U.S. Patent and Trademark Office on Sep. 11, 1991 and now U.S. Pat. No. 5,374,349.

BACKGROUND OF THE INVENTION

The invention relates to acid catalyzed chemical conversion processes, such as hydrocarbon conversion processes, and to the catalysts and catalyst supports used in such processes. The invention is particularly concerned with catalyst supports containing a combination of zeolite Beta and a pillared clay, catalysts comprising such supports and the use of such catalysts in hydrocarbon conversion processes, particularly hydrocracking.

Petroleum refiners often produce desirable products, such as gasoline and turbine fuel, by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions, including an elevated temperature and an elevated pressure and the presence of hydrogen, such that a hydrocarbon product is obtained containing a substantial portion of a desired product boiling in a specified range, as for example, a gasoline boiling in the range of 50° to 420° F.

Oftentimes, hydrocracking is performed in conjunction with hydrotreating, usually by a method referred to as "integral operation." In this process, the hydrocarbon feedstock, usually a gas oil containing a substantial proportion of components boiling above a desired end point, as for example, 420° F. in the case of certain gasolines, is introduced into a catalytic hydro-treating zone wherein, in the presence of a suitable catalyst, such as a zeolite- or sieve-free, particulate catalyst comprising a Group VIII metal component and a Group VIB metal component on a porous, inorganic, refractory oxide support most often composed of alumina, and under suitable conditions, including an elevated temperature (e.g., 400° to 1000° F.) and an elevated pressure (e.g., 100 to 5000 p.s.i.g.) and with hydrogen as a reactant, the organonitrogen components and the organosulfur components contained in the feedstock are converted to ammonia and hydrogen sulfide, respectively. Subsequently, the entire effluent removed from the hydro-treating zone is treated in a hydrocracking zone maintained under suitable conditions of elevated temperature, pressure, and hydrogen partial pressure, and containing a suitable hydrocracking catalyst, such that a substantial conversion of high boiling feed components to product components boiling below the desired end point is obtained. Usually, the hydro-treating and hydrocracking zones in integral operation are maintained in separate reactor vessels, but, on occasion, it may be advantageous to employ a single, downflow reactor vessel containing an upper bed of hydro-treating catalyst particles and a lower bed of hydrocracking particles. Examples of integral operation may be found in U.S. Pat. Nos. 3,132,087, 3,159,564, 3,655,551, and 4,040,944, all of which are herein incorporated by reference in their entireties.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 420° F. range from a gas oil boiling entirely above 570° F., it may often be the case that as much as 30 to 60 percent by volume of the products obtained from integral operation boil above 420° F. To convert these high boiling components to hydrocarbon components boiling below 420° F., the petroleum refiner separates the 420° F.+ high boiling components from the other products obtained in integral operation, usually after first removing ammonia by a water washing operation, a hydrogen-containing recycle gas by high pressure separation, and an $H_2S$-containing, $C_1$ to $C_3$ low BTU gas by low pressure separation. This 420° F+ boiling bottom fraction is then subjected to further hydrocracking, either by recycle to the hydrocracking reactor in single stage operation or by introduction into a second hydrocracking zone wherein yet more conversion to the desired $C_4$ to 420° F. product takes place.

In the foregoing two stage process, the two hydrocracking reaction zones often contain hydrocracking catalysts of the same composition. One catalyst suitable for such use is disclosed as Catalyst A in Example 16 of U.S. Pat. Nos. 3,897,327 and 3,929,672, both of which are herein incorporated by reference in their entireties, which catalyst is comprised of a palladium-exchanged, steam-stabilized Y zeolite hydrocracking component. But although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation, as for example, increased temperature. On the other hand, in the ammonia-deficient atmosphere of the second hydrocracking reaction zone, high conversions to the desired product are obtainable under relatively moderate conditions, often with an operating temperature about 100° to 210° F. lower than that required in the first hydrocracking reaction zone.

Further description of two-stage hydrocracking operations may be found in U.S. Pat. Nos. 4,429,053 and 4,857,169 herein incorporated by reference in their entireties, which patents provide process flow sheets for typical two-stage hydrocracking processes.

Although there exist several types of commercial hydrocracking catalysts which can be used effectively in single stage hydrocracking or either the first, second or both stages of the above-discussed two-stage hydrocracking process, there is always a demand for new catalysts with superior overall activity, selectivity and stability for producing gasoline and/or other products via hydrocracking.

SUMMARY OF THE INVENTION

The present invention provides a composition for use in the acid catalyzed chemical conversion of feedstocks containing organic compounds into reaction products, particularly in the acid catalyzed conversion of hydrocarbons and most especially in hydrocracking. The composition, which may be a catalyst and/or catalyst support, comprises both zeolite Beta and a pillared clay. Although the pillared clay will normally serve as a binder for the zeolite Beta, an amorphous, inorganic refractory oxide, such as alumina, may also be present in the composition. For hydrocracking purposes, the catalyst requires a hydrogenation component, such as one or more Group VIB or Group VIII metal components, the hydrogenation components generally being dispersed on the support material composed of the zeolite Beta and pillared clay.

Preliminary tests indicate that the catalyst supports of the invention, when used in combination with metal hydrogenation components to produce gasoline via hydrocracking, have a higher activity and selectivity for gasoline, both for first stage (in the presence of $NH_3$) and second stage (in the substantial absence of $NH_3$) hydrocracking, as compared to a catalyst now commercially available for use in hydrocracking processes to produce gasoline. Thus, the catalyst and process of the invention appear to be significant improvements in the art of gasoline hydrocracking.

DETAILED DESCRIPTION OF THE INVENTION

The present invention is directed to novel catalysts and catalyst supports and novel acid catalyzed chemical conversion processes employing such catalysts to promote the desired reactions. The present invention is particularly directed to hydrocracking catalysts, and hydrocracking processes employing such catalysts, comprising a hydrogenation component(s) on a support comprising zeolite Beta and a pillared clay.

Zeolite Beta is a crystalline zeolite whose composition and X-ray powder diffraction analysis are disclosed in U.S. Pat. No. Reissue 28,341, herein incorporated by reference in its entirety. This zeolite is a large pore zeolite having a pore size above 7.0 angstroms and a Constraint Index below 2, preferably between 0.6 and 1.0. The Constraint Index of a zeolite is a convenient measure of the extent to which a zeolite provides access to molecules of varying sizes to its internal structure. Zeolites which provide a highly restricted access to and egress from its internal structure have a high value for the Constraint Index, and zeolites of this kind usually have pores of small size. On the other hand, zeolites which provide relatively free access to the internal zeolite structure have a low value for the Constraint Index. The method by which Constraint Index is determined is described fully in U.S. Pat. No. 4,0167,218, the disclosure of which is herein incorporated by reference in its entirety.

Zeolite Beta is prepared, in general, as an aluminosilicate zeolite having a silica-to-alumina mole ratio ($SiO_2:Al_2O_3$) of at least 10 up to about 100, but preferably no more than about 40, and most preferably in the range of 20 to 30. It may also be prepared in yet higher silica-to-alumina mole ratios, e.g., 500:1 or more, and although such materials may have little or no zeolitic properties, it is to be understood that, in the present invention, the term "zeolite Beta" is meant to encompass such materials. The preferred zeolite Betas have a crystal size of about 0.1 to 0.7 micron, a surface area of about 400 to 800, preferably 650 to 750, and most preferably 700 to 750 $m^2$/gm, a cyclohexane adsorption capacity of about 15 to 25 g/100g, and a water vapor sorptive capacity at 25° C. and a $p/p_o$ value of 0.10 of greater than 5 weight percent, typically greater than about 10 weight percent As used herein "$p/p_o$" represents the water vapor partial pressure to which the zeolite Beta is exposed divided by the water vapor partial pressure at 25° C.

As initially prepared, zeolite Beta is usually in the alkali metal form and contains an organic templating agent. In this form, the zeolite has little if any catalytic activity for promoting acid catalyzed conversion reactions, e.g., cracking reactions. Accordingly, the zeolite is generally converted to more active forms, by calcination to decompose and drive off the templating agent, followed by base exchange with ammonium cations to substantially reduce the alkali metal content, followed by another calcination to convert the ammonium-exchanged zeolite to the hydrogen form. For zeolite Betas initially prepared in the sodium form, the preferred sodium content upon conversion to an active form is below 1.0 percent by anhydrous weight, preferably below about 0.5 percent by anhydrous weight, calculated as $Na_2O$.

Publications which further discuss the properties of zeolite Beta include U.S. Pat. Nos. 3,923,641, 4,676,887, 4,812, 223, 4,486,296, 4,601,993, and 4,612,108, all of which are herein incorporated by reference in their entireties.

Also included in the catalyst and catalyst support of the present invention is a pillared clay. Such clays are crystalline materials typically formed by intercalating a pillaring agent, such as colloidal particles, thermally stable, robust, three-dimensional, polynuclear cations and the like, between the silicate layers or platelets of smectites and other expandable clays. Smectite clays are a well-known class of naturally occurring and synthetic layered clays which swell or expand when exposed to moisture. The intercalation is normally accomplished by replacing, typically via ion exchange, naturally occurring interlayered hydrated cations such as sodium cations with the pillaring agent. This is typically carried out by reacting an unexpanded, swelling clay, usually in an aqueous medium, with polyoxymetal cations, mixtures of polyoxymetal cations, colloidal particles comprising silica, alumina, titania, tin oxide, chromia, vanadia, zirconia, niobia, iron oxide, a rare earth oxide, antimony oxide, other metal oxides or mixtures thereof, and cationic metal clusters comprising molybdenum, tungsten, nickel, cobalt or the like. The shape and size of the intercalated pillaring agents allow them to serve, upon the drying and calcining of the clay, as molecular pillars to prop apart the layers of the clay and thereby prevent them from collapsing.

The polyoxymetal cations suitable for use in synthesizing pillared clays are sometimes referred to as polymeric cationic hydroxy metal complexes or as inorganic metal polymers and are formed by the hydrolysis of metal salts. Such complexes or polymers are described in detail in U.S. Pat. Nos. 4,176,090, 4,271,043, and 4,248,739, which patents are hereby incorporated by reference in their entireties. The most preferred pillaring agents for use in preparing pillared clays are the polyoxymetal cations of aluminum, zirconium, chromium, iron or their mixtures. Specific types of polyoxyaluminum cations that may be used include cations having the empirical formula $[Al_{13}O_4(OH)_{24}(H_2O)_{12}]^{+7}$, which cations are found in solutions of aluminum chlorhydroxide, and polyoxyaluminum cations prepared by hydrolyzing an aqueous solution of aluminum chloride. A preferred polyoxyzirconium cation for use as a pillaring agent has the empirical formula $[Zr_4(OH)_{14}(H_2O)_{10}]^{+2}$ and is found in solutions of zirconyl chlorhydroxide. Such solutions are prepared by dissolving zirconyl chloride in distilled water and then aging the resultant solution.

The-cationic metal clusters which may be used as a pillaring agent include polynuclear metal halides containing molybdenum or tungsten. Examples of such halides include $Mo_6Cl_{12}$ and $W_6Cl_{12}$ which are prepared by reacting NaCl, $MoCl_5$ or $WCl_5$ with molybdenum or tungsten metal at a high temperature. The preparation and properties of these halides are described in detail in the article entitled "Convenient Synthesis of the Hexanuclear Molybdenum (II) Halides $Mo_6Cl_{12}$ and $Mo_6Br_{12} \cdot 2H_2O$" published in the *Inorganic Nuclear Chemistry Letters*, Vol. 16, pp. 307–310, (1980). The disclosure of this article is hereby incorporated by reference in its entirety. Other suitable cationic metal clusters contain nickel or cobalt and are prepared by aging solutions of nickel or cobalt nitrate.

The pillared clays suitable for use as a component of the catalyst or catalyst support of the invention contain a fairly homogeneous distribution of pillars in the interlayered spaces which form an array of rectangular openings or pores, typically between about 7 to 20 angstroms high and between about 8 and 20 angstroms wide, which enable the pillared clay to behave like a two-dimensional crystalline molecular sieve. By adjusting the size of the pillars or the spacing between such pillars, or both, the pore size of the pillared clay may be adjusted to suit a particular application. Pillared clays are typically prepared by reacting a smectite clay, such as montmorillonite, saponite, hectorite, and beidellite, with a pillaring agent or propping agent to form a flocculated reaction product which is subsequently dried to convert the pillaring agent into inorganic metal oxide clusters which form the pillars which prop apart the layers of the clay. The X-ray diffraction pattern of a pillared clay normally contains a distinct first order reflection which is indicative of a well ordered, long range, face-to-face orientation of the clay platelets.

A preferred pillared clay for use in the catalyst of the invention is a montmorillonite which has been pillared with polyoxymetal cations of zirconium and therefore has zirconia clusters as the pillars between the layers. Besides a single smectite clay such as montmorillonite, mixed layered smectites such as rectorite and paragonite can also be pillared and used in the catalyst of the invention. Examples of pillared clays which possess stability at high temperatures are ones in which the pillars contain one or more rare earth elements such as cerium and/or lanthanum. Such clays are disclosed in U.S. Pat. Nos. 4,753,909 and 4,952,544 and in PCT International Application WO 88/06614, the disclosures of which patents and application are hereby incorporated by reference in their entireties. It will be understood, however, that pillared clays in which the pillars are substantially free of rare earth elements can be used as a component of the catalyst. Pillared clays and their preparation are described generally in an article entitled "Intercalated Clay Catalysts," *Science*, Vol. 220, No. 4595, pp. 365–371 (Apr. 22, 1983), the disclosure of which is hereby incorporated by reference in its entirety.

At present, it is preferred that the catalyst and catalyst support of the invention contain, except for the possible presence of one or more non-clay, amorphous, inorganic refractory oxide components, only the components described above, i.e., the zeolite Beta and the pillared clay. Preferably, the catalyst and catalyst support will be devoid of any other clays, such as attapulgite, sepiolite and other layered magnesium silicates and other types of zeolites (zeolitic molecular sieve) or nonzeolitic crystalline molecular sieves, including those sieves having pores of intermediate or small size, i.e., below 7.0 angstroms, which are not defined by 12-membered rings of oxygen atoms, and sieves having a large pore size such as rare earth-exchanged Y zeolites, ultrastable Y zeolites, such as Z-14US zeolite, ZSM-4 zeolite, ZSM-18 zeolite and ZSM-20 zeolite. However, in alternative but non-preferred embodiments of the invention, other clays, zeolites or nonzeolitic molecular sieves, such as SAPO-37, may also be present. The term "molecular sieve" as used herein refers to any material capable of separating atoms or molecules based on their respective dimensions. Molecular sieves include zeolites, microporous carbons, porous membranes, aluminas and the like. The term "pore size" as used herein refers to the diameter of the largest molecule that can be sorbed by the particular molecular sieve in question. The measurement of such diameters and pore sizes is discussed more fully in Chapter 8 of the book entitled *Zeolite Molecular Sieves* written by D. W. Breck and published by John Wiley & Sons in 1974, the disclosure of which book is hereby incorporated by reference in its entirety. The term "nonzeolitic" as used herein refers to molecular sieves whose frameworks are not formed of substantially only silicon and aluminum atoms in tetrahedral coordination with oxygen atoms. "Zeolitic" molecular sieves are distinguished from nonzeolitic molecular sieves in that their frameworks are formed of substantially only silicon and aluminum atoms in tetrahedral coordination with oxygen atoms, such as the frameworks present in ZSM-5 zeolites, Y zeolites and X zeolites.

The zeolite Beta and pillared clay required in the catalyst and catalyst support of the invention are embodied into particles which contain both components. Perhaps the most convenient method for physically integrating the two components into individual particulates is to comull a wetted mixture of the components and then extrude the comulled material through a die having small openings therein of desired cross-sectional size and shape, e.g., circle, trilobal clover-leaf, quadrolobal clover leafs, etc., breaking or cutting the extruded matter into appropriate lengths, e.g., ⅛ to ¾ inch, drying the extrudates, and then calcining at a temperature, e.g., 900° F. or higher, to produce a material suitable for use as a catalyst or as a catalyst component for use in high temperature chemical conversion reactions. At present it is preferred that the catalyst be produced in cylindrical form; however, as stated above, other-cross-sectional shapes are possible, such as cloverleafs of polylobal design, for example, trilobal or quadrolobal shapes, as shown, for example, in FIGS. 8 and 10, respectively, in U.S. Pat. No. 4,028,227 herein incorporated by reference in its entirety. Typically, the pillared clay, besides contributing to the catalytic properties of the support, also serves as a binder for the zeolite Beta. Thus alumina and other conventional amorphous, inorganic refractory oxide binder components are normally not required. However, in some instances the presence of such components may be desired.

Regardless of whether an amorphous, inorganic refractory oxide component is used as a binder material to hold the zeolite Beta and pillared clay together in the support, it will be understood that other such components can also be incorporated into the comulled mixture, including for example, inorganic refractory oxide diluents which may or may not possess some type of catalytic activity. Examples of such diluents include clays, alumina, silica-alumina, and a heterogeneous dispersion of finely divided silica-alumina particles in an alumina matrix, which dispersion is described in detail in U.S. Pat. Nos. 4,097,365 and 4,419,271, the disclosures of which are herein incorporated by reference in their entireties. Additionally and alternatively, hydrogenation component precursors can also be comulled into the mixture, as will be discussed in more detail hereinafter.

It will be further understood that producing the catalyst and catalyst support of the invention in extrudate form, while certainly the most highly preferred method, is still but one option available to those skilled in the art. The catalyst and its support may also be produced in tablet, granules, spheres, and pellets, as desired, by any known method for combining zeolites with a porous, inorganic refractory oxide component.

The catalyst of the invention can be used for converting hydrocarbons and other organic compounds into more valuable reaction products by acid catalyzed reactions, such as alkylation, transalkylation, dealkylation, isomerization, dehydrocyclization, dehydrogenation, hydrogenation, cracking, hydrocracking, dewaxing, hydrodewaxing, oligomerization, aromatization, alcohol conversion reactions, the conversion of syngas into mixtures of hydrocarbons, and the like. When the catalyst or support contains zeolite Beta and a pillared clay but no hydrogenation components, it is useful for any of a number of acid-catalyzed hydrocarbon conversion reactions in which hydrogen is not an added reactant, e.g., isomerization, alkylation, transalkylation, cracking, dewaxing, oligomerization, etc. However, since the main benefit of the invention as presently contemplated is in hydroprocessing such as hydrocracking, a process in which hydrogen is an added reactant, the catalyst for this purpose will further require one or more hydrogenation components, in which case the portion of the catalyst exclusive of any hydrogenation metal components is considered the support upon which the hydrogenation component(s) is dispersed.

Whether the zeolite Beta-pillared clay particulates, which may optionally include an inorganic refractory oxide binder and/or diluent, are used as the catalyst itself or as the support (or support component) for hydrogenation metals, the amounts of the zeolite Beta, the pillared clay, and any other components present will normally depend on the particular process in which the particulates are used. For example, when used to selectively produce gasoline in a hydrocracking process, it is preferred that the particulates contain at least 10 weight percent, more preferably at least 20 weight percent, and more preferably still, at least 30 weight percent zeolite Beta and at least 5 weight percent, more preferably at least 10 weight percent, and more preferably still, at least 15 weight percent pillared clay and, optionally, one or more amorphous, porous, inorganic refractory oxides. The zeolite Beta-pillared clay particulates typically contain at least 35 weight percent, preferably between 35 and 75 percent by weight zeolite Beta, with at least 50 percent by weight, preferably at least 75 percent by weight, even more preferably at least 90 percent by weight, and most preferably 100 percent by weight of the balance being pillared clay alone or pillared clay in combination with one or more amorphous, inorganic refractory oxides. On the other hand, when the zeolite Beta-pillared clay particulates are used for selectively producing middle distillates in a hydrocracking process, they will typically contain less than 30 weight percent, preferably less than 20 weight percent and more preferably between 2.5 and 10 weight percent zeolite Beta with at least 50 weight percent, preferably 100 weight percent, of the balance being a pillared clay alone or a pillared clay in combination with an amorphous, inorganic refractory oxide binder and diluent in combination. The weight ratio of the zeolite Beta to the pillared clay in the particulates is usually in the range of 3:1 to 1:3 but other weight ratios may also be used, e.g., ranges of 1.5:1 to 1:1.5, 2:1 to 1:2, 2.5:1 to 1:2.5, etc.

For use in hydroprocessing, such as hydrocracking, the catalyst contains one or more hydrogenation components containing metals selected from the group consisting of Group VIB and/or Group VIII of the Periodic Table of Elements, such components typically being in the form of the free metals or their respective oxides and sulfides, the latter two being most preferred. As used herein "Periodic Table of Elements" refers to the version found in the inside front cover of the *Handbook of Chemistry and Physics*, 65th Edition, published in 1984 by the Chemical Rubber Company, Cleveland, Ohio. The platinum group (or noble) metals of the Group VIII metals may be used, but preference at present is for the base (or non-noble) metals, e.g., nickel and cobalt in particular, and nickel most preferably of all. Thus, the preferred catalysts are those devoid of noble metals and which, therefore, contain Group VIII noble metal-free zeolite Beta. Of the Group VIB metals, molybdenum and tungsten are preferred, with molybdenum being most preferred when the catalyst is to be used in gasoline hydrocracking and tungsten being most preferred when the catalyst is to be used in middle distillate hydrocracking. The most highly preferred catalyst contains both a non-noble Group VIII metal component and a Group VIB metal component, most preferably nickel and molybdenum or nickel and tungsten in combination.

The hydrocracking catalysts of the invention contain at least 0.2 weight percent of the hydrogenation components, calculated as the metals. If noble metals are used, the hydrogenation components are generally present in a relatively low proportion, e.g., 0.2 to 2 weight percent. For the base or non-noble metals, the proportions are generally higher. Non-noble Group VIII metal components are typically employed in proportions between about 2 and 15 weight percent, preferably between 3 and 10 percent by weight, calculated as the respective monoxide. The Group VIB metal component is generally employed in proportions of about 5 to 35 weight percent, preferably in the range of 8 to 30 weight percent, calculated as the respective trioxide. It is to be understood that the proportions given above for the hydrogenation metal components are based on the finished catalyst whereas the proportions expressed above for the zeolite Beta-pillared clay particulates are values in the absence of the hydrogenation metal component, i.e., for the support only. For purposes herein, the term "support" is defined as all materials in the catalyst except the hydrogenation metal components.

The hydrogenation components may be incorporated into the catalyst in any of many ways known in the art for combining hydrogenation components with supports containing zeolites. One such method is to first prepare the support, for example, as an extrudate, containing zeolite Beta, pillared clay, and, optionally, an amorphous inorganic refractory oxide in calcined form, and then impregnating the support with solutions containing the desired metal(s) in dissolved form. Calcination in air, typically in the absence of added steam, at an elevated temperature, e.g., above 800° F., preferably above 900° F., produces the desired catalyst containing metals in oxide form. Likewise, and in another embodiment, the desired metal(s) are introduced by comulling a compound containing such metal(s) in the zeolite Beta-pillared clay mixture previously described, followed by shaping (e.g., extrusion through a die), drying, and calcining in the substantial absence of steam, e.g., at a temperature between about 800° F. and 1000° F., to produce the oxide form of the catalyst. For one preferred catalyst, the comulling is effected with ammonium heptamolybdate as the source of molybdenum and nickel nitrate as the source of nickel, with both compounds generally being introduced into the mulling mixture in the form of an aqueous solution. Other metals can be similarly introduced in dissolved aqueous form; likewise, non-metallic elements, e.g., phosphorus, may be introduced by incorporating a soluble component such as phosphoric acid into the aqueous solution.

By the foregoing procedures or their equivalents, catalysts with the hydrogenation metals present in the oxide form are prepared in particulate form, with the majority of such particles, usually at least 90 weight percent, and preferably substantially all, individually containing zeolite Beta and a pillared clay in a support for the hydrogenation component. The finished hydrocracking catalyst, when used to selectively produce gasoline, will typically comprise (1) between about 20 and 65 weight percent zeolite Beta, preferably between about 30 and 60 weight percent, (2) between about 15 and 55 weight percent pillared clay and porous, inorganic refractory oxide binder, if such a binder is present, preferably between about 20 and 50 weight percent, (3) between about 8 and 30 weight percent Group VIB metal hydrogenation component, calculated as the metal trioxide, preferably between about 10 and 25 weight percent and (5) between about 2 and 15 weight percent non-noble Group VIII hydrogenation metal component, calculated as the metal monoxide, preferably between about 3 and 10 weight percent. When used to selectively produce middle distillates, the hydrocracking catalyst will normally contain the same amount of Group VI and Group VIII metal hydrogenation components as set forth above but will generally contain an inorganic refractory oxide diluent, e.g., alumina or a dispersion of silica-alumina in an alumina matrix, in lieu of a portion of the zeolite Beta and/or pillared clay. Thus, the catalyst will typically contain between about 2 and 25 weight percent zeolite Beta, preferably 3.0 to 15 weight percent, in addition to 40 to 80 weight percent pillared clay and an inorganic, refractory oxide diluent, preferably about 40 to 70 weight percent.

Catalysts which contain hydrogenation components in the oxide form as described above are generally treated to convert the metals to the sulfide form prior to the use of the catalysts in hydrocracking. This can be accomplished by presulfiding the catalyst prior to use at an elevated temperature, e.g., 300° to 700° F., with, for example, a mixture consisting of 10 volume percent $H_2S$ and 90 volume percent $H_2$. Alternatively, the catalyst can be presulfided ex situ by various sulfiding processes; as an illustration, see "Sulficat$^R$: Offsite Presulfiding of Hydroprocessing Catalysts from Eurecat" by J. H. Wilson and G. Berrebi, Catalysts 87, Studies in Surface Science and Catalysts #38 page 393. More preferably, the sulfiding is accomplished in situ, i.e., by using the catalyst in the oxide form to hydrocrack a hydrocarbon feedstock containing sulfur compounds under hydrocracking conditions, including elevated temperature and pressure and the presence of hydrogen.

Hydrocracking catalysts in accordance with the invention are useful in the conversion of a wide variety of hydrocarbon feedstocks to a hydrocarbon product of lower average boiling point and/or molecular weight. The feedstocks that may be subjected to hydrocracking by the method of the invention include all mineral oils and synthetic oils (e.g., shale oil, tar sand products, etc.) and fractions thereof. Illustrative feedstocks include straight run gas oils, vacuum gas oils, coker gas oils, and catcracker distillates. The typical hydrocracking feedstock, however, contains a substantial proportion of components, usually at least 50 percent by volume, often at least 75 percent by volume, boiling above the desired end point of the product, which end point, in the case of gasoline, will generally be in the range of about 380° to 420° F., and in the case of middle distillates, will typically be in the range of 650° to 700° F. Usually, the feedstock will also contain gas oil components boiling above 550° F., with highly useful results being achievable with feeds containing at least 30 percent by volume of components boiling between 600° and 1100° F.

For best results in hydrocracking, the catalyst of the invention will be employed as a fixed bed of catalytic particulates in a hydrocracking reactor vessel into which hydrogen and the feedstock are introduced and passed in a downwardly direction. Operating conditions in the reactor vessel are chosen so as to convert the feedstock into the desired product, which, in one preferred embodiment, is a hydrocarbon product containing a substantial proportion of gasoline components boiling, for example, in the 50° to 420° F. range. However, other products, such as middle distillates boiling in the 300° to 700° F. range, may also be desired on occasion, and conditions must be adjusted according to the product (or distribution of products) desired. The exact conditions required in a given situation will depend upon the nature of the feedstock, the particular catalyst composition utilized, and the desired product(s). In general, the conditions of operation for hydrocracking will fall into the following usual and preferred ranges:

TABLE I

| Conditions | Usual | Preferred |
| --- | --- | --- |
| Temperature, | | |
| °F. | 450–850 | 500–800 |
| °C. | 232–454 | 260–427 |
| Pressure, | | |
| psig | 750–3500 | 1000–3000 |
| atm | 51–238 | 68–204 |
| LHSV, reciprocal hours | 0.3–5.0 | 0.5–310 |
| $H_2$/Feedstock, MSCF/bbl as measured at 60° F. (15.6° C.) and 1 atmosphere | 1–10 | 2–8 |

The foregoing Table I shows the suitable and preferred hydrocracking conditions for single stage or for each stage of a two stage operation (the latter being described more fully in U.S. Pat. No. 4,429,053). It will be understood, however, that the operating conditions in the two stages of the two stage process are not necessarily identical. In fact, as mentioned hereinbefore, the primary difference in conditions in the two hydrocracking reactor vessels of two stage operation is the presence of substantial ammonia, usually greater than about 2000 ppmv or higher in the first stage, and its essential absence, i.e. less than 200 ppmv and preferably less than about 20 ppmv, in the second, allowing for less severe conditions in the second stage. There may, however, be yet other differences in conditions in any particular situation.

The typical gas oil feedstock contains no more than about 15 volume percent, usually less than 10 volume percent, of constituents boiling in the 50° to 420° F. range. When gasoline is the desired product from such feeds, the hydrocracking operating conditions are selected to produce either or both of (1) at least a 35 volume percent yield, preferably at least a 45 volume percent yield, even more preferably at least a 50 volume percent yield, and most preferably of all at least a 65 volume percent yield of 185° to 420° F. gasoline product or (2) at least a 40 volume percent yield, preferably at least a 50 volume percent yield, more preferably at least a 60 volume percent yield, and most preferably of all at least a 70 volume percent yield of 50° to 420° F. product gasoline. On the other hand, when middle distillates are the desired product, the hydrocracking operation conditions are selected to produce at least a 50 volume percent yield, preferably at least a 65 volume percent yield, and most preferably at least a 80 volume percent yield of 300° to 700° F. middle distillate product.

Based on presently available data, the catalyst of the invention as compared to a commercial gasoline hydrocracking catalyst containing a single steam-stabilized Y zeolite having a unit cell dimension of about 24.55 angstroms and no other zeolite or molecular sieve provides for enhanced results when used in either stage of the two stage process. In particular, the catalyst of the invention provides for much higher activity in both stages of the two-stage process, and significant increases in the yield of gasoline boiling in the 50° to 185° F. range and in the 50° to 420° F. range in both stages. These achievements, and others, are proven in the following examples, which are provided for illustrative purposes and not to limit the invention as defined by the claims.

EXAMPLE 1

A pillared clay for use as a component of the catalyst of the invention was prepared by mixing about 100 grams of a white bentonite clay, which had been previously treated to remove iron and other color-producing impurities and which contained greater than 90 weight percent of the clay mineral montmorillonite, with 30 liters of deionized water to form a slurry. The clay was composed of 65.9 weight percent $SiO_2$, 14.1 weight percent $Al_2O_3$, 3.2 weight percent MgO, 1.5 weight percent CaO, 0.4 weight percent $Fe_2O_3$, 0.2 weight percent $TiO_2$, 4.1 weight percent $Na_2O$, and 0.1 weight percent $K_2O$. A zirconyl chlorhydroxide solution was then prepared by diluting 200 milliequivalents of $ZrOCl_2 \cdot 4H_2O$ to about 5 liters with deionized water and allowing the resultant mixture to hydrolyze for 24 hours at a temperature between 50° and 60° C. The zirconyl chlorhydroxide solution was then slowly added to the slurry of clay and water and allowed to react for between 2 and 4 hours at about 30° C. The resultant flocculated product was filtered to produce a cake which was washed with an excess of hot deionized water and then oven-dried at 100° C. for 10 hours. The resultant dried material was calcined at 300° C. for 10 hours to remove water from the clay. An X-ray diffractogram of the resultant pillared clay indicated a uniform pillared structure having a first order reflection at 18.26 angstroms, which reflection corresponds to a pore height of about 8.66 angstroms. The measured BET surface area of the pillared clay was about 310 square meters per gram.

EXAMPLE II

Catalyst 1

Catalyst 1 was prepared by comulling a mixture of 60 weight percent zeolite Beta having an overall silica-to-alumina mole ratio of about 26 and obtained from the PQ Corporation, 20 weight percent pillared clay from Example I, sufficient nickel nitrate to provide 5 weight percent nickel (calculated as NiO) in the final catalyst and sufficient ammonium heptamolybdate to provide 15 weight percent molybdenum (calculated as $MoO_3$) in the final catalyst. Prior to comulling, the zeolite Beta was exchanged with ammonium ions to reduce its sodium content to less than 0.5 weight percent, calculated as $Na_2O$. The comulled mixture was then extruded into 1/16 inch diameter cylindrical particles of between 1/8 and 1/2 inch in length, dried at about 230° F. and calcined at 900° F. in steam-free air. The resulting catalyst contained the nickel and molybdenum in the proportions above specified on a support comprising 75 weight percent zeolite Beta and 25 weight percent pillared clay. The compacted bulk density of the catalyst was 0.48 g/cc. The surface area, pore volume and average pore diameter calculated from mercury intrusion measurements were, respectively, 74 $m^2$/g, 0.60 cc/g and 324 angstroms. The BET surface area calculated from nitrogen sorption measurements was 362 $m^2$/g.

Catalyst 2

Catalyst 2 was prepared similarly to Catalyst 1 except 50 weight percent zeolite Beta and 30 weight percent pillared clay from Example I were used. The resulting catalyst contained the nickel and molybdenum in the proportions above specified for Catalyst 1 on a support comprising 62.5 weight percent zeolite Beta and 37.5 weight percent pillared clay. The compacted bulk density of the catalyst was 0.61 g/cc. The surface area, pore volume and average pore diameter calculated from mercury intrusion measurements were, respectively, 72 $m^2$/g, 0.51 cc/g and 285 angstroms. The BET surface area calculated from nitrogen sorption measurements was 365 $m^2$/g.

Catalyst 3

Catalyst 3 was prepared similarly to Catalysts 1 and 2 except that 30 weight percent zeolite Beta and 50 weight percent pillared clay from Example I were used. The resulting catalyst contained the nickel and molybdenum in the proportions above specified for Catalysts 1 and 2 on a support comprising 37.5 weight percent zeolite Beta, and 62.5 weight percent pillared clay. The compacted bulk density of the catalyst was 0.73 g/cc. The surface area, pore volume and average pore diameter calculated from mercury intrusion measurements were, respectively, 43 $m^2$/g, 0.38 cc/g and 337 angstroms. The BET surface area calculated from nitrogen sorption measurements was 289 $m^2$/g.

Catalyst 4

Catalyst 4 is a sample of a commercial gasoline hydrocracking catalyst obtained from UOP. It contained nickel and molybdenum in the proportions above specified for Catalysts 1 through 3, but unlike Catalysts 1 through 3, its support comprised 80 weight percent LZY-82 zeolite and 20 weight percent alumina. The LZY-82 zeolite used was a steam-stabilized Y zeolite having a unit cell size of about 24.55 angstroms, a pore size above 7.0 angstroms and an overall silica-to-alumina mole ratio of 6.7. The compacted bulk density of the catalyst was 0.76 g/cc. The surface area, pore volume and average pore diameter calculated from mercury intrusion measurements were, respectively, 65 $m^2$/g, 0.29 cc/g and 177 angstroms. The BET surface area calculated from nitrogen sorption measurements was 394 $m^2$/g.

Catalyst 5

Catalyst 5 was prepared similarly to Catalyst 1 except 60 weight percent of the same LZY-82 zeolite present in Catalyst 4 was used in place of zeolite Beta. The resulting catalyst contained nickel and molybdenum in the proportions found in Catalysts 1 through 3 on a support comprising 75.5 weight percent LZY-82 zeolite and 25.5 weight percent pillared clay. The surface area, pore volume and average pore diameter calculated from mercury intrusion measurements were, respectively, 32 $m^2$/g, 0.45 cc/g and 563 angstroms. The BET surface area calculated from nitrogen sorption measurements was 331 m²/g.

Each of the above-described five catalysts was presulfided by passing a gas stream consisting of 10 volume percent H₂S and the balance H₂ through a bed of the catalyst at a temperature initially of about 300° F. and slowly increased to 700° F. and held at that temperature for about 1 hour.

The five catalysts were compared for hydrocracking activity and selectivity (i.e., product yields) in both simulated first and second stage testing. Specifically, the five catalysts were separately tested for hydrocracking a hydrotreated, partially hydrocracked vacuum gas oil feed having an API gravity of 38.7°, an initial boiling point of 373° F., a final boiling point of 807° F., and a 50 percent boiling point of 568° F., with about 8 volume percent boiling below 400° F., as determined by a modified ASTM D1160 distillation.

Each catalyst was first tested for simulated second stage operation in the absence of ammonia by passing the feedstock through a laboratory size reactor vessel containing about 150 milliliters of the presulfided catalyst at a total pressure of 1450 psig, a liquid hourly space velocity (LHSV) of 1.7 reciprocal hours, and a hydrogen feed rate of 8000 scf/bbl as measured at 60° F. In addition, sufficient thiophene was added to the feed to provide a hydrogen sulfide concentration equivalent to 0.5 weight percent sulfur and thereby simulate a hydrogen sulfide-containing atmosphere as it exists in commercial second stage hydrocracking reactors. The temperature conditions were adjusted as necessary to maintain a product of 49.5° API gravity, which, by previously established correlations, corresponds to about a 60 volume percent yield of gasoline-type materials boiling below 420° F., over the course of 100 hours. At the end of the 100 hours, the temperature required to maintain the product was recorded, and using Catalyst 4 as a reference, the activity and selectivity of each catalyst relative to this catalyst were calculated. These comparative data are summarized in Table II below.

After the second stage simulation, the conditions in the reactor vessel were altered for first stage simulation under ammonia-rich conditions, in particular, by adding, along with the thiophene, sufficient tert-butyl amine to the feed to provide an ammonia concentration equivalent to 0.2 weight percent nitrogen and adjusting the temperature to maintain production of a liquid product of 47.0° API gravity, which, by previously established correlations, corresponds to about a 40 percent yield of gasoline-type products boiling below 420° F. Again, after a further 100 hours operation, data were recorded comparing the catalysts against the performance of Catalyst 4 as a reference, the data being summarized in the following Table II.

TABLE II

| Catalyst Designation: | 1 | 2 | 3 | 4** | 5 |
|---|---|---|---|---|---|
| Composition, wt. % | | | | | |
| Pillared Clay | 20 | 30 | 50 | — | 20 |
| Zeolite Beta | 60 | 50 | 30 | — | — |
| LZY-82 Zeolite | — | — | — | 64 | 60 |
| Alumina | — | — | — | 16 | — |
| Second Stage: | | | | | |
| Activity, °F. | −36 | −46 | −15 | 0 | +10 |
| 420° F.- conversion, vol. % | +6.1 | +3.4 | +4.3 | 0 | −1.7 |
| C₁–C₃ yield, scf/bbl | +4.1 | −6.9 | +5.3 | 0 | 0 |
| C₄ yield, vol. % | +1.4 | +0.5 | +1.1 | 0 | −0.2 |
| 50–185° F. fraction C₅–C₆ yield, vol. % | +10.3 | +8.4 | +10.2 | 0 | +1.7 |
| 185–420° F. fraction yield, vol. % | −3.5 | −3.9 | −4.7 | 0 | −0.8 |
| 50–420° C. F. yield, vol. % | +6.7 | +4.5 | +5.3 | 0 | +0.9 |
| 300–550° F. fraction yield, vol. % | −1.0 | +0.43 | 0 | 0 | −1.7 |
| First Stage: | | | | | |
| Activity, °F. | −35 | −32 | −22 | 0 | +8 |
| 420° F.-conversion, vol. % | +6.6 | +3.4 | +2.9 | 0 | +1.9 |
| C₁–C₃ yield, scf/bbl | +19.8 | −0.1 | +9.1 | 0 | +5.5 |
| C₄ yield, vol. % | +1.1 | +0.6 | +1.1 | 0 | −0.4 |
| 50–185° F. fraction C₅–C₆ yield, vol. % | +8.8 | +7.9 | +7.7 | 0 | +3.4 |
| 185–420° F. fraction yield, vol. % | −2.5 | −3.9 | −4.6 | 0 | −0.1 |
| 50–420° F. yield, vol. % | +6.6 | +4.1 | +3.3 | 0 | +3.2 |
| 300–550° F. fraction yield, vol. % | −1.7 | −2.8 | −1.3 | 0 | −2.2 |

**Catalyst 4 is used as a reference to evaluate the performance of Catalysts 1 through 3 and 5. Thus, the first and second stage activity and yield data for Catalyst 4 are entered as zeroes while the data for Catalysts 1 through 3 and 5 are entered as the difference between the actual value for activity or yield of the catalyst minus the actual value for activity or yield obtained with Catalyst 4. The more negative the value for activity, the more active is the catalyst.

As shown in Table II, the catalytic activity of Catalysts 1 through 3, all of which are catalysts of the invention containing zeolite Beta and a pillared clay, are substantially greater than that of the reference commercial catalyst, i.e., Catalyst 4, in both simulated first and second stage hydrocracking even though the commercial catalyst contains more zeolite than any one of the catalysts of the invention. Catalyst 1, which contains 60 weight percent zeolite Beta compared to the 64 weight percent LZY-82 zeolite present in Catalyst 4, is 35° F. more active in the first stage and 36° F. more active in the second stage. Catalyst 3, which contains only 30 weight percent zeolite Beta, is 22° F. more active than Catalyst 4 in the first stage and 15° F. more active in the second stage. Since the activity of a hydrocracking catalyst approximately doubles for every 30° F. decrease in activity temperature, Catalyst 1 is more than twice as active as Catalyst 4 in both simulated first and second stage hydrocracking, whereas Catalyst 3, which contains less than half the zeolite content, is about 50 percent more active.

Catalysts 1 through 3 also show significant advantages over the commercial catalyst with respect to yields of light gasoline, the 50°–185° F. boiling fraction, and total gasoline, the 50°–420° F. boiling fraction, in both first and second stage simulated hydrocracking. For example, Catalyst 1 yields 8.8 and 6.6 volume percent more light gasoline and total gasoline, respectively, in first stage hydrocracking, while giving 10.3 and 6.7 volume percent more light and total gasoline, respectively, in second stage hydrocracking. Catalyst 3, which contains about half the zeolite content of Catalysts 1 and 4, gives similar results.

It appears from comparing the data for Catalyst 1 with that of Catalyst 5, which catalyst is similar to Catalyst 1 but contains LZY-82 zeolite, a steam-stabilized zeolite having the faujasite structure, in place of zeolite Beta, that the activity performance of Catalyst 1 in simulated first and second stage hydrocracking is unexpectedly much superior. Catalyst 1, a catalyst of the invention, is 43° F. [−35−(+8)] more active in the first stage and 46° F. [−36−(+10)] more active in the second stage. These differentials in activity temperature represent over a 125 percent improvement in activity which means that Catalyst 1 can be used for hydrocracking a given feedstock under the same operating conditions as Catalyst 5 but at a feed rate that is over 125 percent higher. Alternatively, Catalyst 1 can be used to produce the same conversion as Catalyst 5 at the same feed rate but initially at a temperature 43° F. lower in the first stage and 46° F. lower in the second stage. These temperature differentials represent a significant savings in fuel when using Catalyst 1, a catalyst of the invention, as compared to Catalyst 5.

A comparison of the activity data obtained for the three catalysts of the invention, i.e., Catalysts 1 through 3, reveals that the activities of the catalysts increase proportionally to the amount of zeolite Beta present when used in first stage hydrocracking, i.e., ammonia-rich hydrocracking. The activity deltas increase from −22° F. for Catalyst 3, which contains 30 weight percent zeolite Beta, to −32° F. for catalyst 2, which contains 50 weight percent zeolite Beta, to −35° F. for Catalyst 1 which contains 60 weight percent zeolite Beta. This trend, i.e., an increase in activity of a catalyst proportionally to its zeolite content is expected. However, the activity data for second stage hydrocracking, i.e., hydrocracking in the substantial absence of ammonia, shows a surprising and unexpected result. The activity deltas of the catalysts do not increase proportionately to zeolite content but show a peak at −46° F. for Catalyst 2, which contains 50 weight percent zeolite Beta, and a subsequent decrease to −36° F. for Catalyst 1, which contains 60 weight percent zeolite Beta. These data clearly indicate a critical range of zeolite Beta content for obtaining optimum activity in an ammonia-deficient hydrocracking environment is between about 20 and 65 weight percent, preferably between about 30 and 60 weight percent, and more preferably between about 40 and 60 weight percent.

In summary, as to the data in Table II, it has been found that Catalysts 1 through 3, which contain a mixture of zeolite Beta and a pillared clay, are superior in activity and in selectivity for producing light gasoline in both first and second stage hydrocracking to a current commercial catalyst (Catalyst 4) containing LZY-82 zeolite and alumina. Catalyst 1 is also much superior in activity to catalyst 5 which is identical except that it contains LZY-82 zeolite instead of zeolite Beta. Finally, the activities measured for Catalysts 1 through 3 clearly represent an unexpected result in second stage hydrocracking because they increase to a maximum and then decline as the zeolite Beta content increases from 30 to 60 weight percent.

Although the invention has been described in conjunction with examples and by reference to the preferred embodiments thereof, it is evident that many alternatives, modifications, and variations will be apparent to those skilled in the art in light of the foregoing description. Accordingly, it is intended in the invention to embrace these and all such alternatives, variations, and modifications as may fall within the spirit and scope of the appended claims.

I claim:

1. An extruded catalyst consisting essentially of a uniform mixture of zeolite Beta, a hydrogenation component selected from the group consisting of molybdenum, tungsten, nickel, cobalt and the oxides and sulfides of each member thereof and a pillared clay.

2. The composition of claim 1 wherein said zeolite Beta is present in an amount between about 25 and 65 weight percent.

3. The composition of claim 1 devoid of a layered magnesium silicate.

4. The composition of claim 1 wherein said pillared clay has an X-ray powder diffraction pattern containing a first-order reflection.

5. A hydrocracking catalyst consisting essentially of a calcined comulled mixture of zeolite Beta, pillared clay and one or more metal hydrogenation components selected from the group consisting of molybdenum, tungsten, nickel, cobalt and the oxides and sulfides of each member thereof.

6. The catalyst of claim 5 wherein said pillared clay comprises a pillared montmorillonite.

7. The catalyst of claim 5 comprising between about 30 and about 60 weight percent zeolite Beta and between about 20 and about 50 weight percent pillared clay.

* * * * *